Patented July 18, 1933

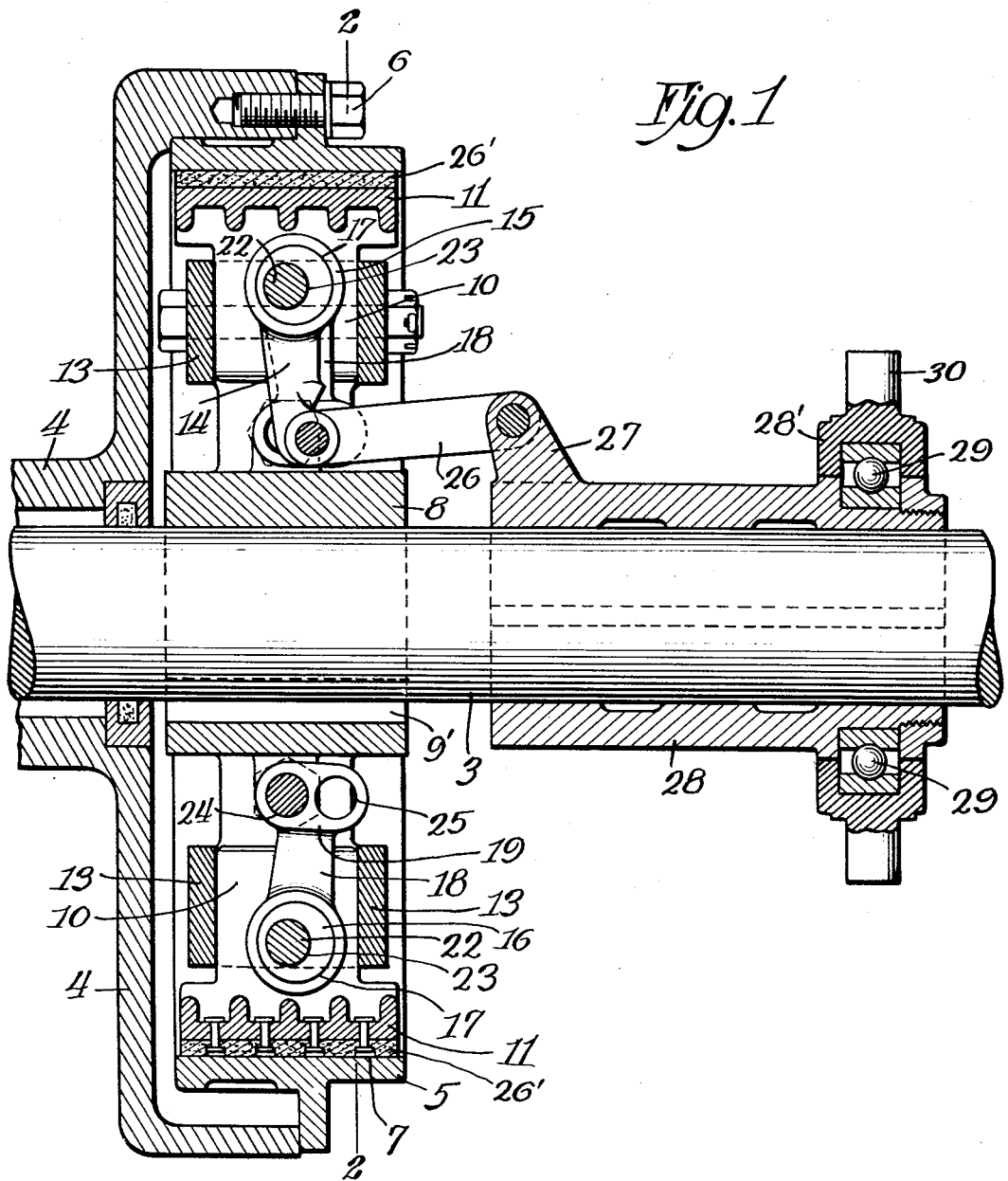

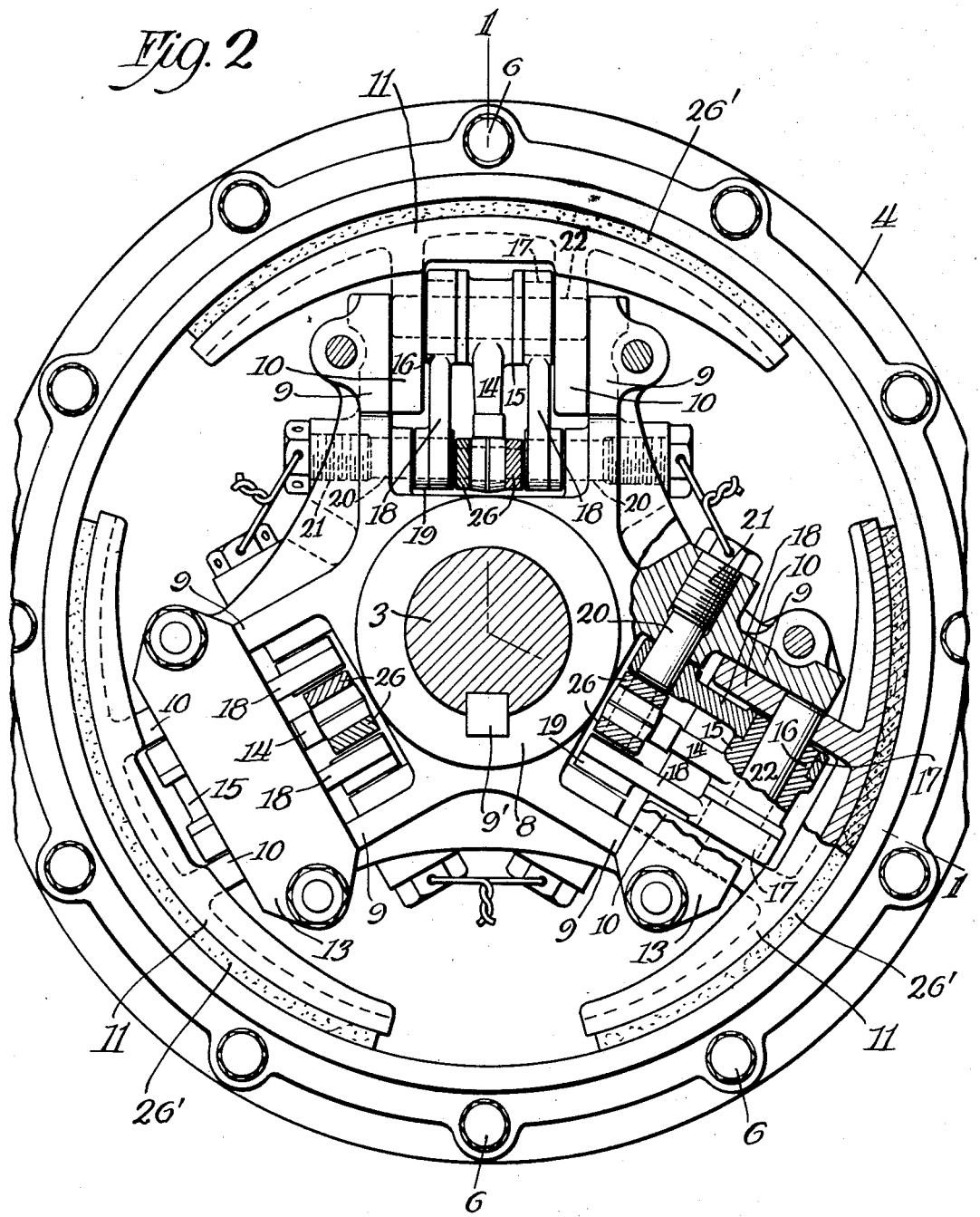

1,918,286

UNITED STATES PATENT OFFICE

WILLIAM J. PEARMAIN, OF RACINE, WISCONSIN, ASSIGNOR TO THE TWIN DISC CLUTCH COMPANY, OF RACINE, WISCONSIN, A CORPORATION OF WISCONSIN

SHOE CLUTCH

Application filed November 24, 1930. Serial No. 497,649.

My invention relates to so-called shoe clutches in which radially movable shoes, mounted upon one of two concentric shafts or other revoluble elements to be connected and disconnected, are adapted to be moved outwardly to engage the inner periphery of a drum on the other of such revoluble elements to cause the two members to move in unison, and to be drawn inwardly to disconnect such elements. The clutch to which this application relates is particularly adapted for heavy work and for power operation, but with certain obvious modifications of the intermediate connection may be adapted for lighter work and manual operation. The object of my invention is to provide a powerful clutch, of the class mentioned, of relatively simple design and effective operation.

Referring to the drawings accompanying and forming a part of this specification, Figure 1 is a diametric section on the planes of the line 1—1 of Fig. 2 of a preferred form of my clutch, a shaft on which the clutch is mounted being shown in elevation, and Fig. 2 is a transverse section thereof on the line 2—2 of Fig. 1, parts being shown in elevation.

In describing the preferred form of the invention, the shaft 3 will be called the driven member and the member 4 which surrounds the shaft and carries the drum 5 the driving member, for convenience of reference. The drum 5 is shown as bolted to the driving member at 6 and is formed with a smooth inner periphery 7 for engagement by the clutch shoes to be presently described.

On the shaft 3 is mounted a spider or frame 8, the hub of which is keyed to the shaft as at 9'. Referring more particularly to Fig. 2 of the drawings, it will be seen that the spider or frame comprises, in addition to the hub above mentioned, annularly arranged, radial guide members shown as three in number, each composed of a pair of guide posts 9—9. The inner or adjacent surfaces of the guide posts of each pair are parallel to receive and guide the pair of parallel radial lugs 10 with which each clutch shoe 11 is formed or provided. The guide posts of each pair are connected on opposite sides by cross plates 13 bolted thereto. The cross plates with the guide posts constitute a rectangular boxing in which the shoe lugs 10 slide and are guided.

A lever 14 is associated with each clutch shoe for moving it into and out of contact with the surrounding drum. The lever is formed with a hub 15 having reduced cylindrical journals 16 (shown in dotted lines in Fig. 2) at its respective ends, the journals being seated in enlarged bearings 17 formed in the outer ends of links 18, there being a pair of such links for each lever. Each link is formed at its inner end with a perforated boss or eye 19 into which extends the end of a pivot bolt 20 screwed at 21 into the corresponding guide post. A pivot pin 22 extends between the shoe lugs 10, and through an eccentric bore 23 in the hub of the lever. Obviously, by swinging the lever and thus oscillating the hub thereof, the pin 22 eccentrically mounted in the hub and pivoted in the guide lugs of the shoe, as heretofore explained, is caused to move inwardly and outwardly and thus control the position of the shoe with reference to the drum.

Preferably, the inner ends of the links are formed each with two openings or bores 24—25 (see Fig. 1) one of the openings in each link being slightly more remote from the bearing 17 than the other. Thus by pivoting the link in the one hole or the other the effective length thereof may be varied. So, when the soles 26' of the shoes are new and consequently thicker, the links may be pivoted through the less remote openings 24, the thickness of the soles being such that, with the proportioning of the other parts, the movement of the levers will carry them into and out of effective engagement with the surrounding drum. When, however, the friction soles are worn down a certain amount, depending on the proportioning of the parts, the links may be adjusted to take up the wear by pivoting them in the other set of holes 25.

The inner ends of the respective levers 14 are pivoted between the ends of pairs of links 26, the other ends of which are pivoted to lugs 27 on a sliding sleeve 28 on the shaft 3. By shifting the sleeve toward and from the hub of the clutch the levers are caused to swing to move the shoes into and out of engagement with the surrounding drum. In the drawings the shoes are shown with unworn soles in engaging or clutching position. By pushing the sleeve toward the hub 8 of the clutch, the levers are correspondingly swung and, through the eccentric connection above described, withdraw the shoes from engagement with the drum. The sleeve is provided with a shifting ring 28′, mounted on the sleeve by means of a roller bearing 29 and provided with a pair of trunnions 30 by means of which the ring and consequently the sleeve is pushed in and out on the shaft. Preferably, especially in the case of larger clutches, the sleeve is shifted by or through steam or other elastic medium. The operation of the sleeve is thus cushioned, and by so designing the clutch that initially, when the friction soles are new, there is a considerable clearance or space between the hub and the sleeve, wear of the clutch shoes and other parts is automatically taken up to a certain extent. When, however, the wear has reached the stage that further adjustment is required, the effective length of the links 18 is adjusted, as heretofore described, and thereafter wear is again taken up automatically until a stage is reached at which replacement of the shoe soles is in order.

I claim:

1. In a clutch of the class described, a drum adapted to be attached to a driving member, a spider adapted to be attached to a driven member, shoes radially movable on the spider, links pivoted on the spider, levers journaled in the links and extending inwardly, means for swinging the levers, and connections between the levers and shoes eccentric with respect to the journals of the levers, whereby the swinging of the levers causes the shoes to move radially of the clutch.

2. In a clutch of the class described, a drum adapted to be attached to a driving member, a spider adapted to be attached to a driven member, shoes radially movable on the spider, an inwardly extending lever for each shoe, a pivot pin connecting said lever to its shoe, a pair of links in which the lever is pivoted eccentrically with respect to the said pivot pin, said links being pivoted at their inner ends to said spider, and means pivotally connected to the inner ends of the levers for swinging the levers to reciprocate said shoes into and out of contact with said drum.

3. In a clutch of the class described, a drum adapted to be attached to a driving member, a spider adapted to be attached to a driven member, said spider comprising pairs of parallel posts constituting radial guides, a shoe having a pair of guide lugs extending between and guided by each pair of guide posts, a pivot pin connecting said lugs, an inwardly extending lever mounted on said pivot pin, a pair of links respectively on opposite sides of said lever and in which the latter is journaled eccentrically with respect to said pivot pin, the inner ends of said links being pivoted to the spider, and means connected to the inner ends of said levers and movable axially of the clutch for oscillating the levers.

4. In a clutch of the class described, a drum adapted to be attached to a driving member, a spider adapted to be attached to a driven member, shoes radially movable with respect to said spider into and out of contact with said drum, each shoe having a pair of parallel inwardly projecting lugs, guide posts on the spider between which said lugs extend and by which they are guided, an inwardly extending lever for each shoe and between the lugs thereof, a pivot pin connecting said lever and lugs, a pair of links arranged respectively on opposite sides of said lever between said lugs and in which said lever is journaled with respect to said pivot pin, pivot pins extending through the respective guide posts and on which said links are pivoted at their inner ends, and means connected to their inner ends for swinging said levers.

5. In a clutch of the class described, a drum adapted to be attached to a driving member, a spider adapted to be attached to a driven member, shoes radially movable on the spider, an inwardly extending lever for each shoe, a pivot pin connecting said lever to its shoe, a pair of links arranged respectively on opposite sides of the lever and in which the latter is eccentrically journaled, said links being provided with a plurality of pivot openings at their inner ends the openings of each lever being arranged at different distances from the bearing thereof in which the lever is journaled, pivot pins on the spider adapted to engage said openings, and means connected to their inner ends for swinging the levers.

In testimony whereof, I have subscribed my name.

WILLIAM J. PEARMAIN.